US012027792B2

(12) United States Patent
Takagi

(10) Patent No.: US 12,027,792 B2
(45) **Date of Patent: *Jul. 2, 2024**

(54) CONNECTOR INCLUDING A CONTACT, AN ELECTRICAL WIRE, AND A SLEEVE MEMBER THAT ACCOMMODATES PARTS OF THE CONTACT AND ELECTRICAL WIRE

(71) Applicant: JAPAN AVIATION ELECTRONICS INDUSTRY, LIMITED, Tokyo (JP)

(72) Inventor: Youhei Takagi, Irvine, CA (US)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 148 days.

This patent is subject to a terminal disclaimer.

(21) Appl. No.: 17/737,793

(22) Filed: May 5, 2022

(65) Prior Publication Data

US 2023/0033701 A1 Feb. 2, 2023

Related U.S. Application Data

(60) Provisional application No. 63/226,217, filed on Jul. 28, 2021.

(51) Int. Cl.
*H01R 13/428* (2006.01)
*H01R 13/52* (2006.01)

(52) U.S. Cl.
CPC ....... *H01R 13/428* (2013.01); *H01R 13/5205* (2013.01)

(58) Field of Classification Search
CPC .. H01R 13/428; H01R 13/426; H01R 13/424; H01R 13/5205; H01R 13/5202; H01R 13/52
See application file for complete search history.

(56) References Cited

U.S. PATENT DOCUMENTS 6,149,472 A 11/2000 Endo et al.
9,548,556 B2 * 1/2017 Uchida .............. H01R 13/5205
(Continued)

FOREIGN PATENT DOCUMENTS

JP 2000091014 A 3/2000
JP 6044508 B2 7/2012
(Continued)

*Primary Examiner* — Harshad C Patel
(74) *Attorney, Agent, or Firm* — Holtz, Holtz & Volek PC

(57) ABSTRACT

A connector comprises a housing, a holder, a contact, an electrical wire and a sleeve member. The housing is formed with a contact accommodating portion. The contact accommodating portion is formed with a first receiving portion. The holder is formed with a second receiving portion. The contact is provided with a first press-fit portion. The sleeve member is provided with a first abutment portion, a second abutment portion and a second press-fit portion. The first abutment portion abuts against the first receiving portion. The second abutment portion abuts against the second receiving portion. One of the first press-fit portion and the second press-fit portion is press-fit into a remaining one of the first press-fit portion and the second press-fit portion in a direction perpendicular to the front-rear direction and thereby a relative movement of the sleeve member with respect to the contact along the front-rear direction is regulated.

7 Claims, 10 Drawing Sheets

(56) References Cited

U.S. PATENT DOCUMENTS

| | | | | |
|---|---|---|---|---|
| 9,647,370 | B2 * | 5/2017 | Uchida ................ | H01R 13/426 |
| 2008/0050947 | A1 * | 2/2008 | Nunokawa ........... | H01R 12/585<br>439/82 |
| 2011/0059659 | A1 * | 3/2011 | Matsumoto .......... | H01R 13/426<br>439/733.1 |
| 2012/0238130 | A1 * | 9/2012 | Osawa ............... | H01R 13/5825<br>439/460 |
| 2013/0337693 | A1 * | 12/2013 | Mori .................... | H01R 13/521<br>439/626 |
| 2015/0207260 | A1 * | 7/2015 | Sugiyama ............ | H01R 13/426<br>439/752 |
| 2016/0294096 | A1 | 10/2016 | Uchida | |
| 2019/0135131 | A1 | 5/2019 | Wenz | |

FOREIGN PATENT DOCUMENTS

| | | | |
|---|---|---|---|
| JP | 5875136 | B2 | 1/2016 |
| JP | 5939954 | B2 | 5/2016 |
| JP | 2016197541 | A | 11/2016 |
| JP | 2021022579 | A | 2/2021 |

* cited by examiner

CONNECTOR INCLUDING A CONTACT, AN ELECTRICAL WIRE, AND A SLEEVE MEMBER THAT ACCOMMODATES PARTS OF THE CONTACT AND ELECTRICAL WIRE

BACKGROUND OF THE INVENTION

This invention relates to a connector comprising a contact, an electrical wire and a sleeve member.

As shown in FIG. 17, Patent Document 1 discloses a connector 900 comprising a contact 910, an electrical wire 950 and a sleeve member 920. As shown in FIG. 19, the contact 910 has a terminal connecting portion 912, a coupling portion 914 and held portions 916. The coupling portion 914 is positioned beyond the terminal connecting portion 912 in a negative X-direction of an X-direction which is an axial direction of the contact 910. The coupling portion 914 is provided with a locking hole 9142. As shown in FIG. 18, the electrical wire 950 is connected to the contact 910. The sleeve member 920 has a front wall 922, a mating protrusion 924 and holding protrusions 926. The front wall 922 is formed with slits 923. Each of the slits 923 has a ceiling surface 9232. The mating protrusion 924 protrudes in a positive X-direction of the X-direction from a center of the front wall 922, wherein the X-direction is an axial direction of the sleeve member 920. A negative Z-side surface of the mating protrusion 924 is provided with a locking protrusion 9242. The locking protrusion 9242 is engaged into the locking hole 9142 and thereby the contact 910 and the sleeve member 920 are integrally connected with each other. The held portion 916 is sandwiched by the ceiling surface 9232 and the holding protrusion 926. This prevents the contact 910 from tilting relative to the sleeve member 920.

[Patent Document 1] JP-A 2016-197541

In order to attach the contact 910 to the sleeve member 920 along the axial direction so that the held portion 916 is sandwiched by the ceiling surface 9232 and the holding protrusion 926, the locking protrusion 9242 must have a play in the axial direction under a state where the locking protrusion 9242 is engaged into the locking hole 9142. Specifically, looseness of the sleeve member 920 relative to the contact 910 in the axial direction is inevitable in the connector 900 of Patent Document 1.

SUMMARY OF THE INVENTION

It is therefore an object of the present invention to provide a connector which prevents looseness of a sleeve member relative to a contact in an axial direction of the sleeve member.

One aspect of the present invention provides a connector comprising a housing, a holder, a contact, an electrical wire and a sleeve member. The housing is formed with a contact accommodating portion. The contact accommodating portion has a rear end in a front-rear direction. The contact accommodating portion is formed with a first receiving portion. The first receiving portion faces rearward in the front-rear direction. The holder is attached to the housing. The holder defines the rear end of the contact accommodating portion. The holder is formed with a through hole and a second receiving portion. The through hole pierces the holder in the front-rear direction. The second receiving portion faces forward in the front-rear direction. The contact is, at least in part, accommodated in the contact accommodating portion. The contact is provided with a first press-fit portion. The electrical wire is connected to the contact. The electrical wire extends from the contact accommodating portion to an outside of the contact accommodating portion through the through hole. The sleeve member is attached to the contact so as to accommodate a part of the contact and a part of the electrical wire. The sleeve member is provided with a first abutment portion, a second abutment portion and a second press-fit portion. The first abutment portion abuts against the first receiving portion. The second abutment portion abuts against the second receiving portion. One of the first press-fit portion and the second press-fit portion is press-fit into a remaining one of the first press-fit portion and the second press-fit portion in a direction perpendicular to the front-rear direction and thereby a relative movement of the sleeve member with respect to the contact along the front-rear direction is regulated.

In the connector of the present invention, the one of the first press-fit portion and the second press-fit portion is press-fit into the remaining one of the first press-fit portion and the second press-fit portion in the direction perpendicular to the front-rear direction and thereby the relative movement of the sleeve member with respect to the contact along the front-rear direction is regulated. In other words, looseness of the sleeve member relative to the contact in an axial direction of the sleeve member is prevented in the connector of the present invention.

An appreciation of the objectives of the present invention and a more complete understanding of its structure may be had by studying the following description of the preferred embodiment and by referring to the accompanying drawings.

Figure 1:
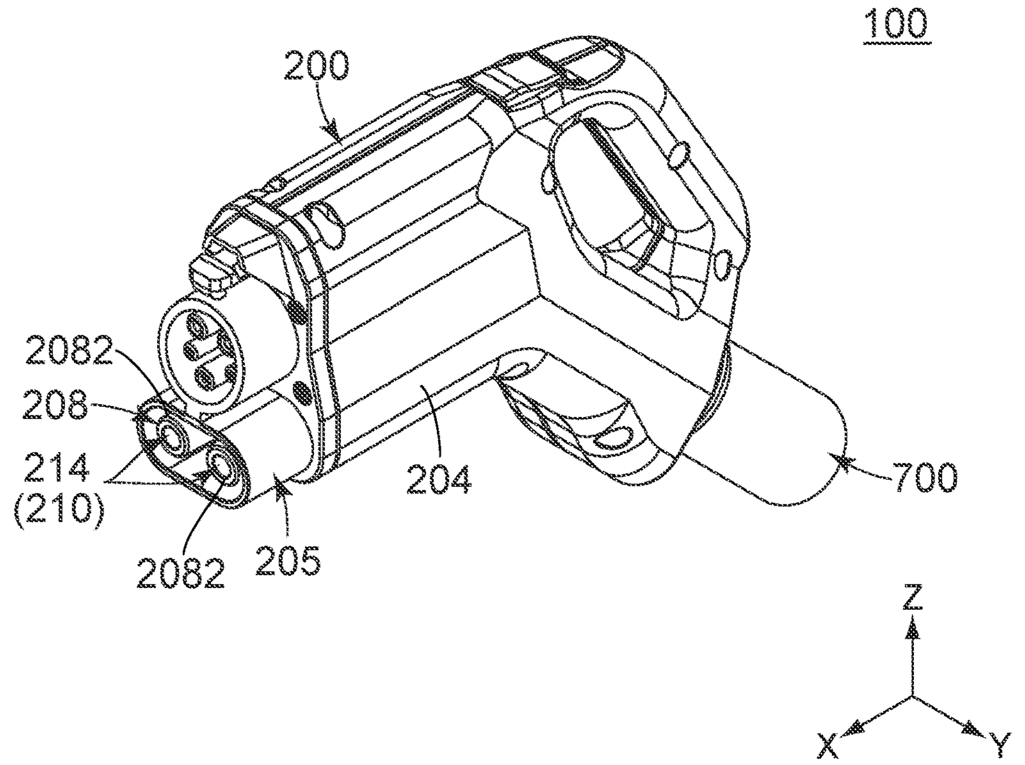
FIG. 1 is a front, perspective view showing a connector according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 3:
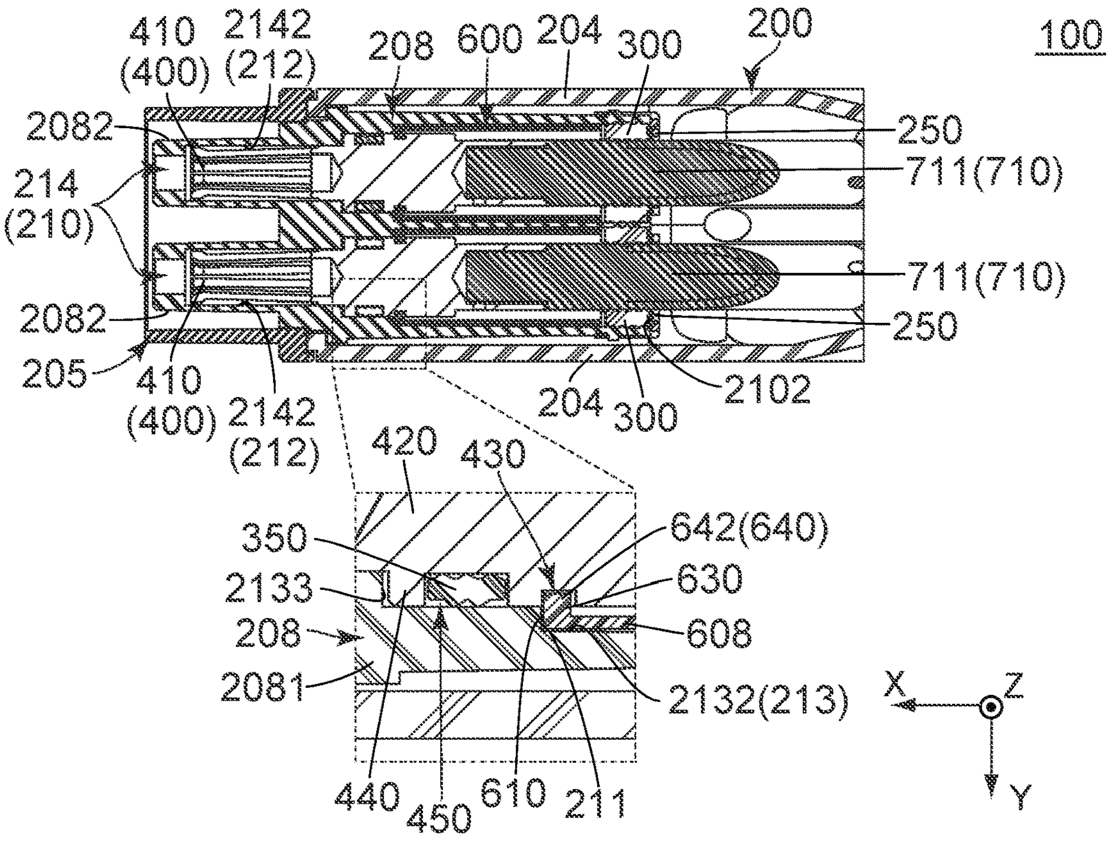
FIG. 3 is a cross-sectional view showing the connector of FIG. 2, taken along line A-A. In the figure, a part of the connector is illustrated enlarged.
Figure 4:
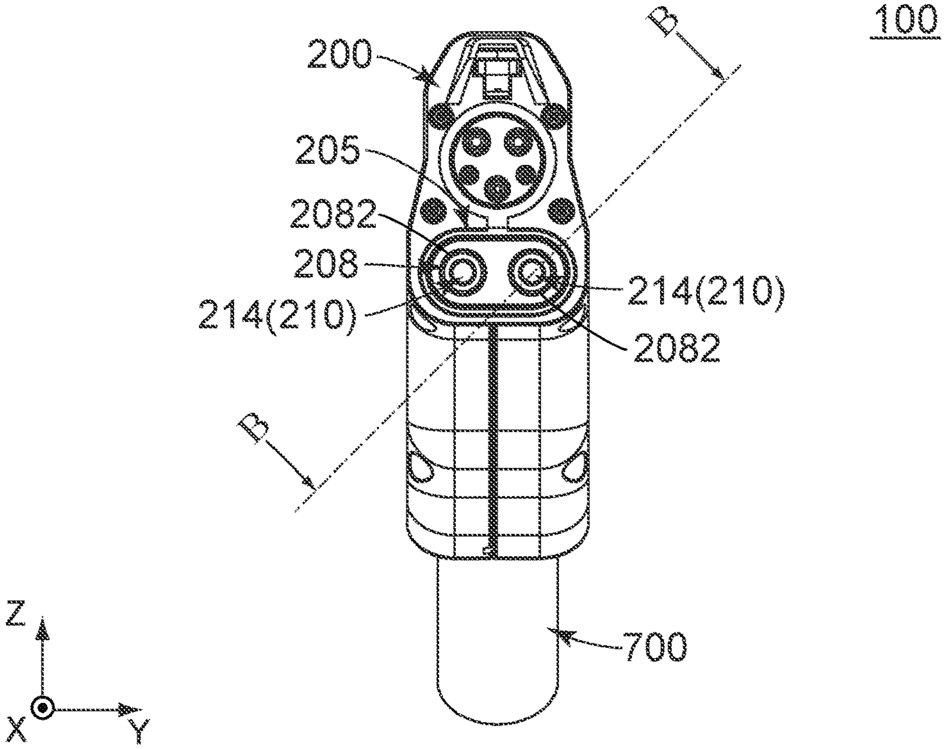
FIG. 4 is a front view showing the connector of FIG. 1.

As shown in FIG. 3, a connector 100 according to an embodiment of the present invention comprises a housing 200, two holders 250, two contacts 400, two electrical wires 710 and two sleeve members 600. However, the present invention is not limited thereto, but the connector 100 should comprise the housing 200, the holder 250, the contact 400, the electrical wire 710 and the sleeve member 600.

Figure 2:
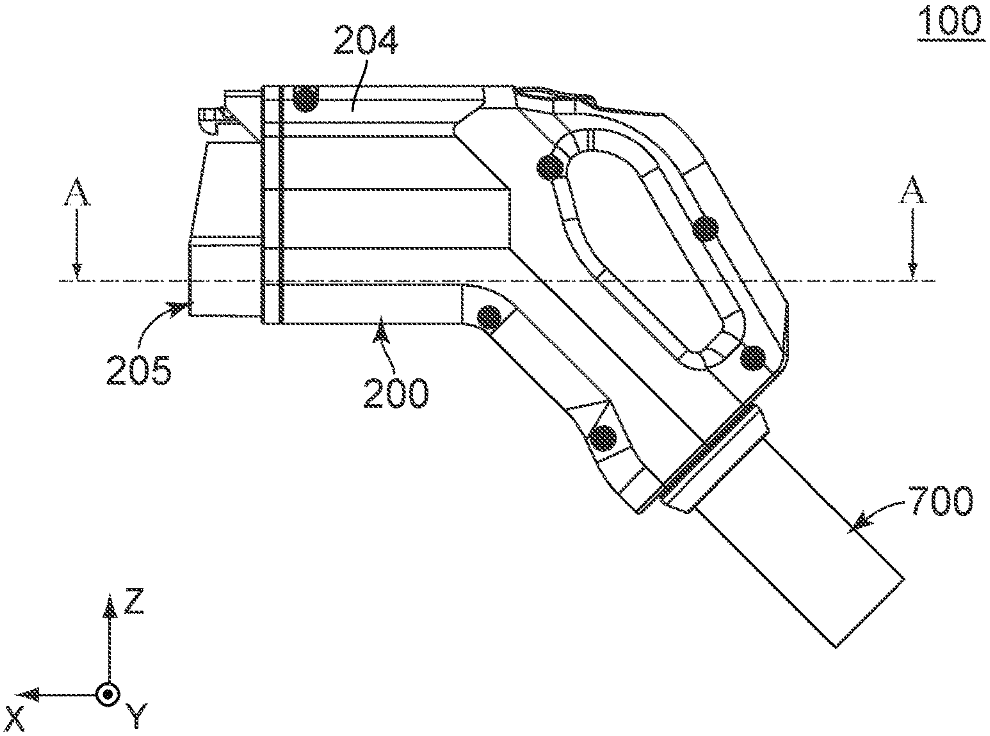
FIG. 2 is a side view showing the connector of FIG. 1.

Referring to FIGS. 2 and 3, the two electrical wires 710 of the present embodiment form a cable 700. The electrical wires 710 have the same configuration as each other. Each of the electrical wires 710 has a core wire 711.

Referring to FIG. 1, the connector 100 of the present embodiment is mateable with a mating connector (not shown) which has mating contacts (not shown). More specifically, the connector 100 is mateable from behind the mating connector along a front-rear direction with the mating connector which is positioned forward of the connector 100. The mating contact of the mating connector is a so-called male contact. In the present embodiment, the front-rear direction is an X-direction. Specifically, forward is a positive X-direction while rearward is a negative X-direction.

Referring to FIG. 1, the housing 200 of the present embodiment is made of resin. The housing 200 has two covers 204, a mating portion 205 and a housing main 208.

Referring to FIG. 1, the covers 204 of the present embodiment are attached to opposite sides, respectively, of the connector 100 in a horizontal direction. In the present embodiment, the horizontal direction is a Y-direction. In addition, the horizontal direction is also referred to as a right-left direction. Specifically, it is assumed that rightward is a positive Y-direction while leftward is a negative Y-direction.

As shown in FIG. 2, the mating portion 205 of the present embodiment defines a front end of the housing 200 in the front-rear direction. The mating portion 205 is received in a mating portion receiving portion of the mating connector when the connector 100 is mated with the mating connector.

As shown in FIG. 3, the housing main 208 has two contact accommodating portions 210. In other words, the housing 200 is formed with the two contact accommodating portions 210. However, the present invention is not limited thereto, but the number of the contact accommodating portion 210 may be one.

Referring to FIG. 3, each of the contact accommodating portions 210 of the present embodiment is a hole whose cross-section perpendicular to the front-rear direction is circular. Each of the contact accommodating portions 210 pierces the housing main 208 in the front-rear direction. Each of the contact accommodating portions 210 has an inner wall 212. The inner wall 212 defines an outer end of the contact accommodating portion 210 in a direction perpendicular to the front-rear direction. The contact accommodating portion 210 has a rear end 2102 in the front-rear direction.

As shown in FIG. 3, the housing main 208 of the present embodiment has two first tube portions 2081 and two second tube portions 2082.

Referring to FIG. 3, each of the first tube portions 2081 of the present embodiment has a substantially cylindrical shape extending in the front-rear direction. Specifically, each of the first tube portions 2081 has the substantially cylindrical shape which is centered about an axis parallel to the front-rear direction. The first tube portion 2081 is positioned rearward in the front-rear direction beyond the second tube portion 2082. The first tube portion 2081 defines a rear end of the housing main 208 in the front-rear direction. The two first tube portions 2081 do not communicate with each other in the horizontal direction. Each of the first tube portions 2081 has a first accommodating portion 213.

Referring to FIG. 3, the first accommodating portion 213 of the present embodiment is a hole whose cross-section perpendicular to the front-rear direction is circular. The first accommodating portion 213 has a first inner wall 2132. The first inner wall 2132 defines an outer end of the first accommodating portion 213 in the direction perpendicular to the front-rear direction. A part of the electrical wire 710 is accommodated in the first accommodating portion 213. In other words, the part of the electrical wire 710 is accommodated in the contact accommodating portion 210. The first accommodating portion 213 is formed with a first receiving portion 211 and a facing portion 2133. In other words, the contact accommodating portion 210 is formed with the first receiving portion 211.

As shown in FIG. 3, the first receiving portion 211 of the present embodiment faces rearward in the front-rear direction. The first receiving portion 211 is positioned rearward in the front-rear direction beyond the facing portion 2133. The first receiving portion 211 is positioned rearward of the second accommodating portion 214 in the front-rear direction. The first receiving portion 211 is positioned outward beyond the facing portion 2133 in a direction perpendicular to a direction in which the axis of the first tube portion 2081 extends.

As shown in FIG. 3, the facing portion 2133 of the present embodiment faces rearward in the front-rear direction. The facing portion 2133 is positioned around a front end of the first accommodating portion 213 in the front-rear direction. The facing portion 2133 is positioned forward in the front-rear direction beyond the first receiving portion 211. The facing portion 2133 is positioned rearward of the second accommodating portion 214 in the front-rear direction. The facing portion 2133 is positioned inward beyond the first receiving portion 211 in the direction perpendicular to the direction in which the axis of the first tube portion 2081 extends.

Referring to FIG. 3, each of the second tube portions 2082 of the present embodiment has a substantially cylindrical shape extending in the front-rear direction. Specifically, each of the second tube portions 2082 has the substantially cylindrical shape which is centered about an axis parallel to the front-rear direction. The second tube portion 2082 is positioned forward in the front-rear direction beyond the first tube portion 2081. The second tube portion 2082 defines a front end of the housing main 208 in the front-rear direction. The two second tube portions 2082 are positioned away from each other in the horizontal direction. As shown in FIG. 1, each of the second tube portions 2082 is surrounded by the mating portion 205 in the direction perpendicular to the front-rear direction. As shown in FIG. 3, in the front-rear direction, a front end of the second tube portion 2082 is positioned rearward beyond a front end of the mating portion 205. Each of the second tube portions 2082 has a second accommodating portion 214. The contact accommodating portion 210 includes the first accommodating portion 213 and the second accommodating portion 214.

Referring to FIG. 3, the second accommodating portion 214 of the present embodiment is a hole whose cross-section perpendicular to the front-rear direction is circular. The second accommodating portion 214 is positioned forward in the front-rear direction beyond the first accommodating portion 213. The second accommodating portion 214 has a second inner wall 2142. The second inner wall 2142 defines an outer end of the second accommodating portion 214 in the direction perpendicular to the front-rear direction. The inner wall 212 includes the first inner wall 2132 and the second inner wall 2142.

Figure 5:
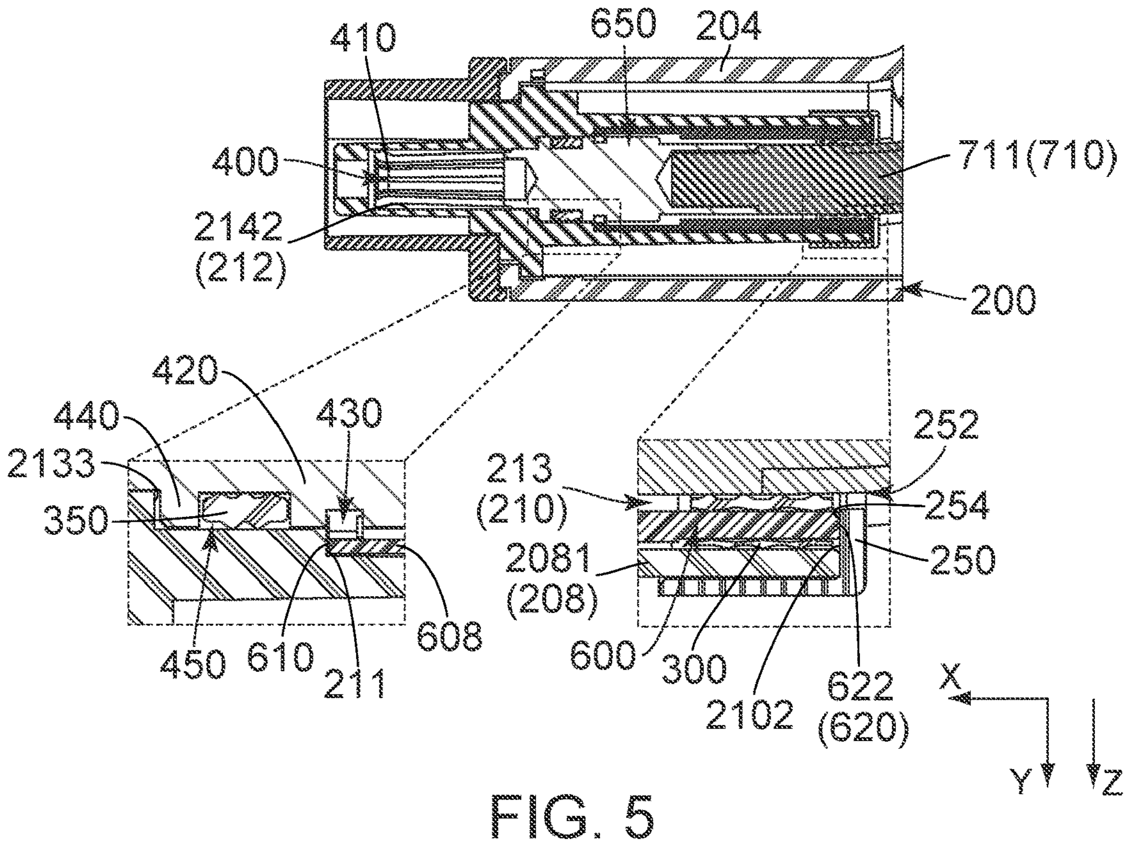
FIG. 5 is a cross-sectional view showing the connector of FIG. 4, taken along line B-B. In the figure, parts of the connector are illustrated enlarged.
Figure 6:
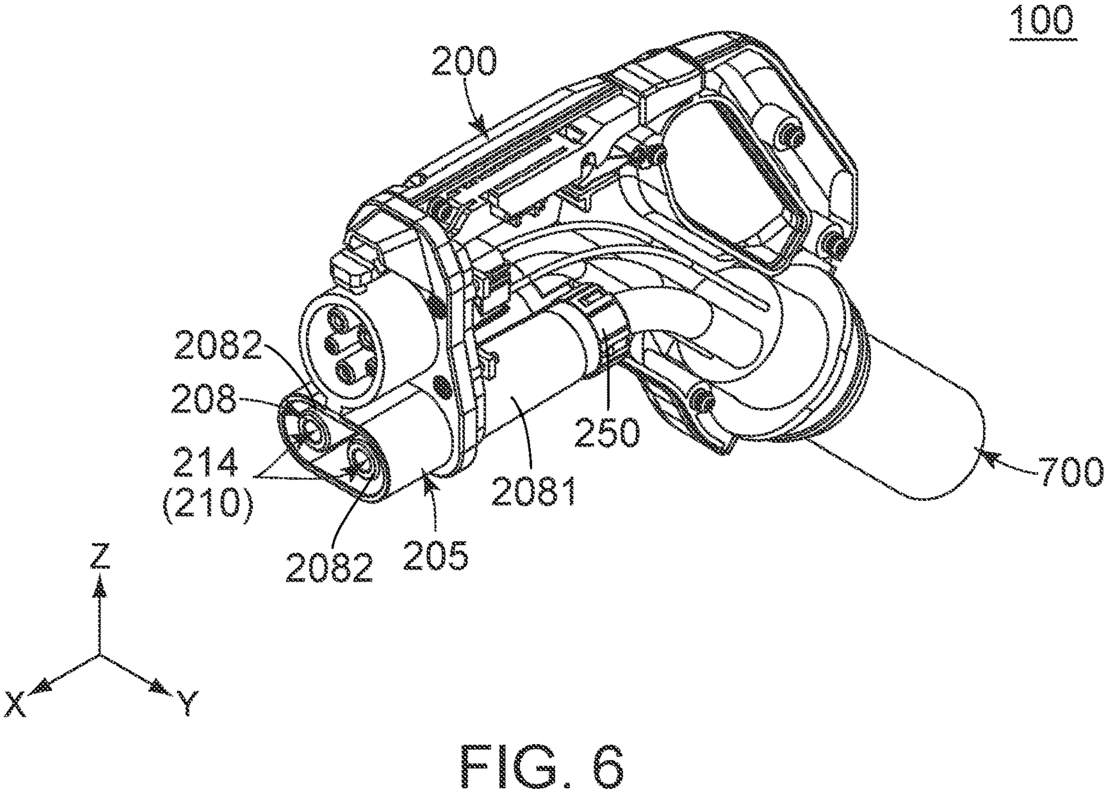
FIG. 6 is a front, perspective view showing an internal structure of the connector of FIG. 1. In the figure, one of covers is removed from the connector.

As shown in FIG. 5, each of the holders 250 of the present embodiment is attached to the housing main 208. In other words, each of the holders 250 is attached to the housing 200. The holder 250 defines the rear end 2102 of the contact accommodating portion 210. Each of the holders 250 is formed with a through hole 252 and a second receiving portion 254. The through hole 252 pierces the holder 250 in the front-rear direction. The electrical wire 710 extends from the contact accommodating portion 210 to the outside through the through hole 252 of the holder 250. More specifically, the electrical wire 710 extends from the first accommodating portion 213 to the outside through the through hole 252 of the holder 250. The second receiving portion 254 faces forward in the front-rear direction. The second receiving portion 254 is positioned around a rear end of the holder 250 in the front-rear direction.

Figure 11:
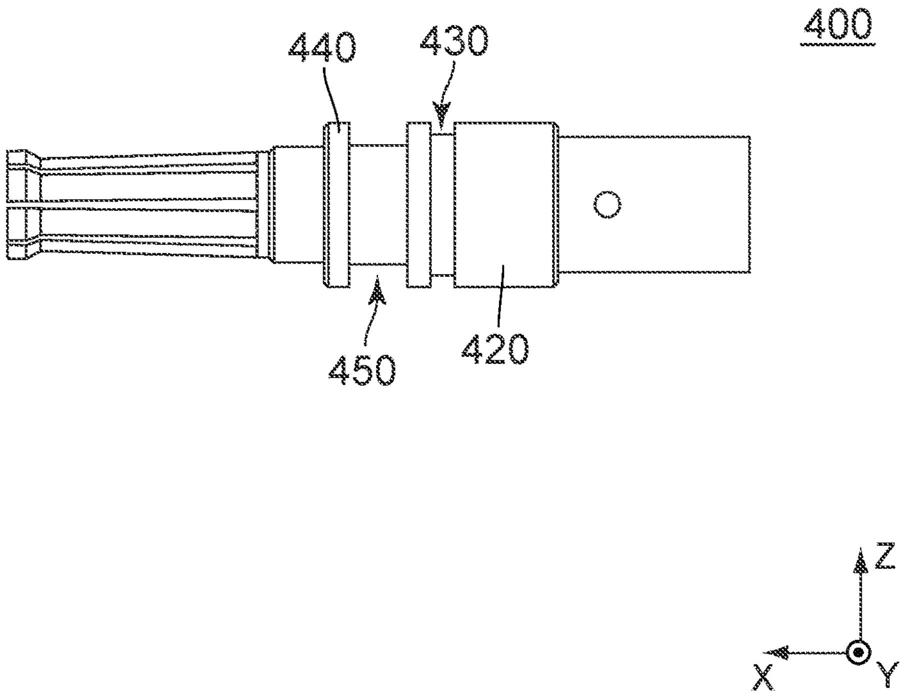
FIG. 11 is a side view showing a contact which is included in the connector element of FIG. 10.

Referring to FIG. 11, each of the contacts 400 of the present embodiment is made of metal. The contact 400 is a so-called female contact. As shown FIG. 3, the two contacts 400 are arranged in the horizontal direction. The contacts 400 are accommodated in the contact accommodating portions 210, respectively. However, the present invention is not limited thereto, but the contact 400 should be, at least in part, accommodated in the contact accommodating portion 210. The electrical wire 710 is connected to the contact 400. Each of the contacts 400 is provided with a contact portion 410, a contact main 420 and a wall portion 440.

Referring to FIG. 3, the contact portions 410 of the present embodiment are brought into contact with the mating contacts, respectively, when the connector 100 and the mating connector are mated with each other. The contact portion 410 is positioned forward of the contact main 420 in the front-rear direction. The contact portion 410 is positioned around a front end of the contact 400 in the front-rear direction. The contact portion 410 is accommodated in the second accommodating portion 214. The contact portion 410 is positioned forward of the first accommodating portion 213 in the front-rear direction. The contact portion 410 is positioned forward of the facing portion 2133 in the front-rear direction. The contact portion 410 is positioned forward of the first receiving portion 211 in the front-rear direction.

As shown in FIG. 3, the contact main 420 of the present embodiment is positioned rearward of the contact portion 410 in the front-rear direction. The contact main 420 defines a rear end of the contact 400 in the front-rear direction. The electrical wire 710 is connected to the contact main 420. The contact main 420 is provided with a first press-fit portion 430 and a front waterproofing portion accommodating portion 450. In other words, each of the contacts 400 is provided with the first press-fit portion 430.

As shown in FIG. 11, the first press-fit portion 430 of the present embodiment is a recess. Specifically, the first press-fit portion 430 is recessed inward in the direction perpendicular to the front-rear direction.

As shown in FIG. 11, the front waterproofing portion accommodating portion 450 of the present embodiment is recessed inward in the direction perpendicular to the front-rear direction. The front waterproofing portion accommodating portion 450 is positioned forward of the first press-fit portion 430 in the front-rear direction.

As shown in FIG. 11, the wall portion 440 of the present embodiment is positioned around a front end of the contact main 420 in the front-rear direction. The wall portion 440 protrudes outward in the direction perpendicular to the front-rear direction from the contact main 420. The wall portion 440 is positioned forward of the front waterproofing portion accommodating portion 450 in the front-rear direction. As shown in FIG. 3, the wall portion 440 directly faces the facing portion 2133 in the front-rear direction. The front waterproofing portion 350 does not directly face the facing portion 2133 in the front-rear direction. In other words, the front waterproofing portion 350 does not directly face the housing 200 in the front-rear direction. The wall portion 440 is not brought into contact with the facing portion 2133 in the front-rear direction.

Figure 10:
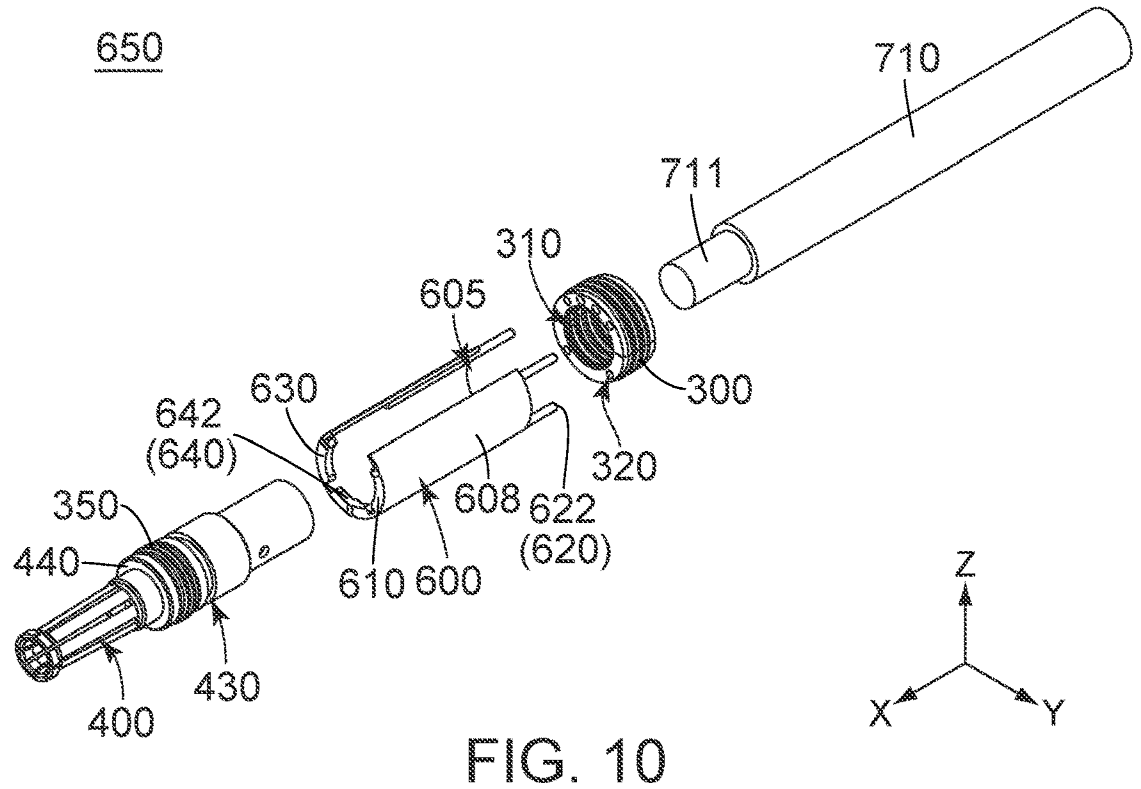
FIG. 10 is an exploded, perspective view showing the connector element of FIG. 7.

Referring to FIG. 10, each of the sleeve members 600 of the present embodiment is made of resin. Each of the sleeve members 600 consists of a single member. Each of the sleeve members 600 extends in the front-rear direction. Each of the sleeve members 600 has a substantially C-shaped cross-section in a plane perpendicular to the front-rear direction. Each of the sleeve members 600 opens at its upper part in the up-down direction. In other words, each of the sleeve members 600 has a cut 605 at its upper end in the up-down direction. However, the present invention is not limited thereto, but the sleeve member 600 should have an annular-shaped cross-section with a cut 605, or a polygonal ring-shaped cross-section with a cut 605. By this configuration, the sleeve member 600 is attachable with the contact 400 after the electrical wire 710 is connected to the contact 400. In the present embodiment, the up-down direction is a Z-direction. Specifically, upward is a positive Z-direction while downward is a negative Z-direction.

As shown in FIG. 3, the sleeve members 600 are positioned in the contact accommodating portions 210, respectively. More specifically, the sleeve member 600 is positioned in the first accommodating portion 213. The sleeve members 600 correspond to the contacts 400 and the electrical wires 710, respectively. The sleeve member 600 is attached to the contact 400 so as to accommodate a part of the contact 400 and a part of the electrical wire 710. Specifically, each of the sleeve members 600 accommodates a part of the contact main 420 of the corresponding contact 400 and the part of the corresponding electrical wire 710. As shown in FIG. 5, the sleeve member 600 is sandwiched by the first receiving portion 211 and the second receiving portion 254 in the front-rear direction. Accordingly, the sleeve member 600 is immovable in the front-rear direction in the contact accommodating portion 210.

Referring to FIG. 10, the sleeve member 600 is provided with a main portion 608, four holding protrusions 620 and a second press-fit portion 630.

As shown in FIG. 10, the main portion 608 of the present embodiment extends in the front-rear direction. The main portion 608 has a C-shaped cross-section in the plane perpendicular to the front-rear direction. The main portion 608 has a first abutment portion 610.

As shown in FIG. 10, the first abutment portion 610 of the present embodiment is positioned at a front end of the main portion 608 in the front-rear direction. The first abutment portion 610 defines a front end of the sleeve member 600 in the front-rear direction. The first abutment portion 610 faces forward in the front-rear direction. As shown in FIG. 3, the first abutment portion 610 abuts against the first receiving portion 211. More specifically, the first abutment portion 610 abuts against the first receiving portion 211 from behind in the front-rear direction.

As shown in FIG. 10, each of the holding protrusions 620 of the present embodiment extends rearward in the front-rear direction from the main portion 608. The holding protrusion 620 defines a rear end of the sleeve member 600 in the front-rear direction. As understood from FIGS. 7 and 10, the holding protrusions 620 of the sleeve member 600 are inserted into the holding holes 320, respectively, of the rear waterproofing portion 300 and are held thereby. In other words, the sleeve members 600 are fixed to the rear waterproofing portions 300, respectively. Each of the holding protrusions 620 has a second abutment portion 622.

Figure 13:
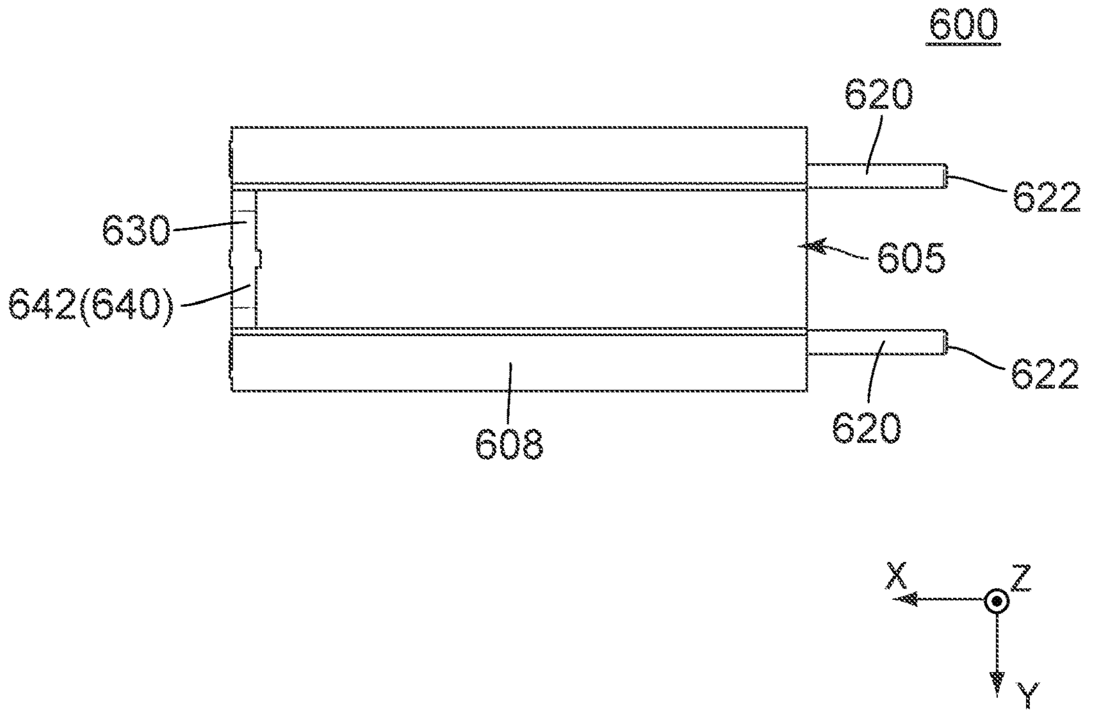
FIG. 13 is a top view showing the sleeve member of FIG. 12.
Figure 14:
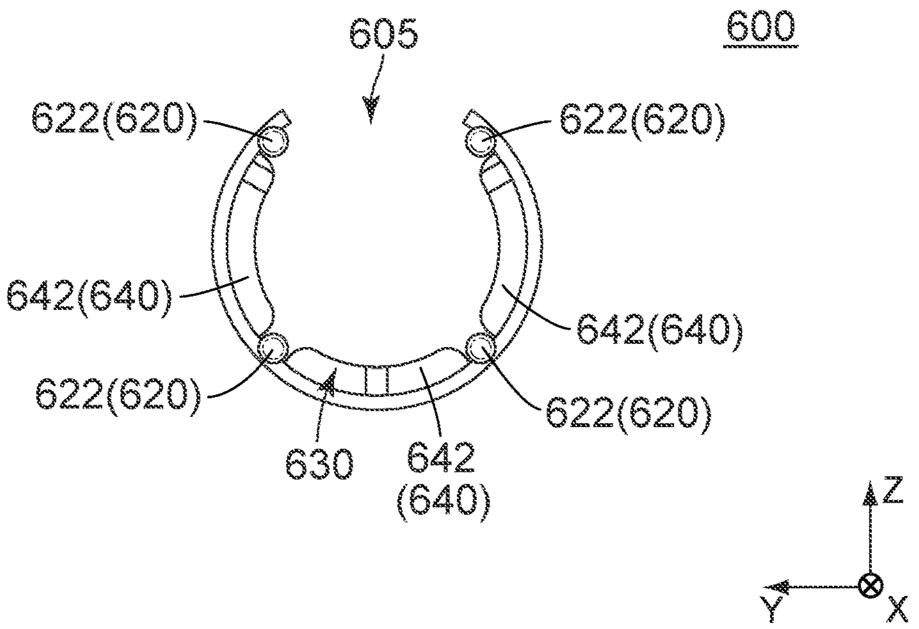
FIG. 14 is a rear view showing the sleeve member of FIG. 12.

As shown in FIG. 13, the second abutment portion 622 of the present embodiment is positioned at a rear end of the holding protrusion 620 in the front-rear direction. The second abutment portion 622 faces rearward in the front-rear direction. As shown in FIG. 5, the second abutment portion 622 abuts against the second receiving portion 254. More specifically, the second abutment portion 622 abuts against the second receiving portion 254 from its front in the front-rear direction.

As described above, the main portion 608 has the first abutment portion 610, while each of the holding protrusions 620 has the second abutment portion 622. In other words, the sleeve member 600 is provided with the first abutment portion 610, the second abutment portions 622 and the second press-fit portion 630.

Figure 9:
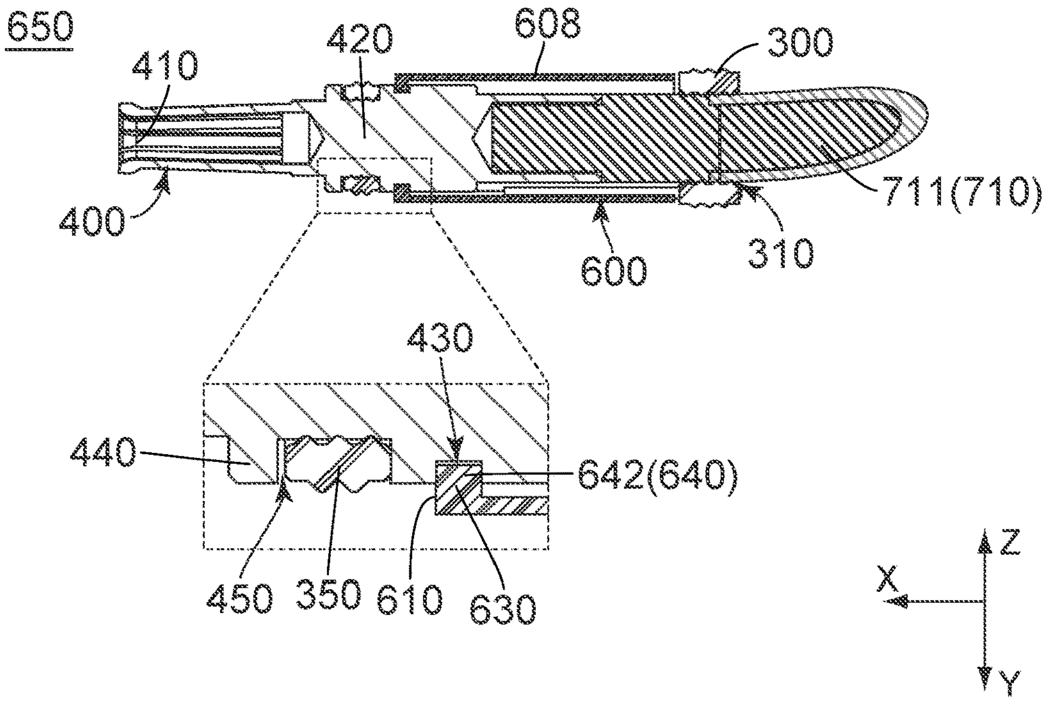
FIG. 9 is a cross-sectional view showing the connector element of FIG. 8, taken along line C-C. In the figure, a part of the connector element is illustrated enlarged.

As shown in FIG. 9, the second press-fit portion 630 of the present embodiment is positioned at the front end of the sleeve member 600 in the front-rear direction. The second press-fit portion 630 is a protrusion. Since the first press-fit portion 430 is the recess as described above, the second press-fit portion 630 is press-fit into the first press-fit portion 430 in the direction perpendicular to the front-rear direction and thereby a relative movement of the sleeve member 600 with respect to the contact 400 along the front-rear direction is regulated. In other words, looseness of the sleeve member 600 relative to the contact 400 in an axial direction of the sleeve member 600 is prevented in the connector 100 of the present embodiment.

Figure 12:
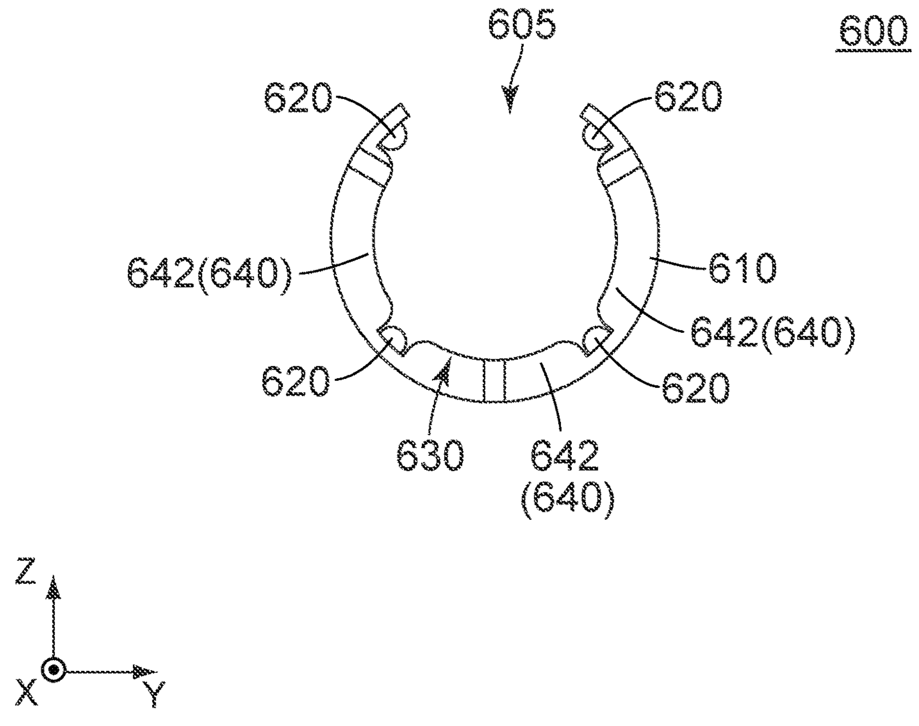
FIG. 12 is a front view showing a sleeve member which is included in the connector element of FIG. 10.

As shown in FIG. 12, the second press-fit portion 630 consists of three protrusions 640 which are spaced away from each other in a circumferential direction about an axis parallel to the front-rear direction. However, the present invention is not limited thereto, but the second press-fit portion 630 should consist of two or more of protrusions 640 which are spaced away from each other in the circumferential direction about the axis parallel to the front-rear direction. Accordingly, when the sleeve member 600 is intended to be attached to the contact 400 after the electrical wire 710 is connected to the contact 400, the sleeve member 600 is more easily attached to the contact 400 because the cut 605 of the sleeve member 600 can be significantly widened in the horizontal direction. Each of the protrusions 640 protrudes inward in a direction perpendicular to the axis. Each of the protrusions 640 is positioned at a position different from any of the holding protrusions 620 in the circumferential direction. Each of the protrusions 640 has a thicker portion 642. In other words, the second press-fit portion 630 has three of the thicker portions 642. As shown in FIG. 3, each of the thicker portions 642 is press-fit into the first press-fit portion 430. However, the present invention is not limited thereto, but the second press-fit portion 630 should have at least three thicker portions 642 each of which is press-fit into the first press-fit portion 430. By this configuration, the contact 400 is held by the sleeve member 600 at three points and thereby an attitude of the contact 400 relative to the sleeve member 600 is stabilized.

As shown in FIG. 3, the connector 100 of the present embodiment further has two rear waterproofing portions 300.

Figure 15:
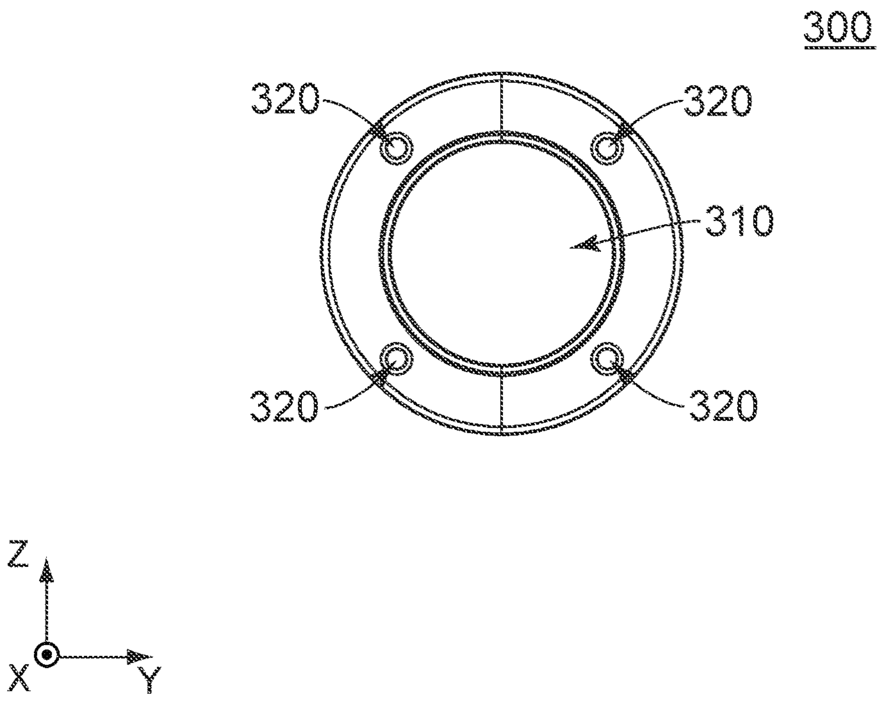
FIG. 15 is a front view showing a rear waterproofing portion which is included in the connector element of FIG. 10.

Referring to FIG. 15, each of the rear waterproofing portions 300 of the present embodiment is made of insulator such as rubber having elasticity. Each of the rear waterproofing portions 300 has a through hole 310 and four holding holes 320. As shown in FIG. 9, the electrical wire 710 is inserted into the through hole 310 of the rear waterproofing portion 300. In other words, the rear waterproofing portion 300 holds the electrical wire 710. As shown in FIG. 3, the rear waterproofing portions 300 are positioned in the contact accommodating portions 210, respectively. The rear waterproofing portion 300 is positioned in the first accommodating portion 213. More specifically, the rear waterproofing portion 300 is positioned at a rear end of the first accommodating portion 213 in the front-rear direction. The rear waterproofing portion 300 is positioned rearward of the second accommodating portion 214 in the front-rear direction. The rear waterproofing portion 300 is positioned rearward of the contact portion 410 in the front-rear direction. The rear waterproofing portion 300 is positioned rearward of the contact main 420 in the front-rear direction. The rear waterproofing portions 300 correspond to the electrical wires 710, the contacts 400 and the contact accommodating portions 210, respectively. Each of the rear waterproofing portions 300 seals a space between the corresponding electrical wire 710 and the inner wall 212 of the corresponding contact accommodating portion 210. More specifically, each of the rear waterproofing portions 300 seals a space between the corresponding electrical wire 710 and the first inner wall 2132 of the first accommodating portion 213 of the corresponding contact accommodating portion 210.

As shown in FIG. 3, the connector 100 of the present embodiment further comprises two front waterproofing portions 350.

Referring to FIG. 10, each of the front waterproofing portions 350 is made of insulator such as rubber having elasticity. The front waterproofing portion 350 is attached to an outer circumference of the contact 400. As shown in FIG. 3, the front waterproofing portion 350 is positioned in the front waterproofing portion accommodating portion 450. The front waterproofing portions 350 are positioned in the contact accommodating portions 210, respectively. The front waterproofing portion 350 is positioned in the first accommodating portion 213. More specifically, the front waterproofing portion 350 is positioned at the front end of the first accommodating portion 213 in the front-rear direction. The front waterproofing portion 350 is positioned rearward of the second accommodating portion 214 in the front-rear direction. The front waterproofing portion 350 is positioned rearward of the contact portion 410 in the front-rear direction. The front waterproofing portion 350 is positioned forward of the electrical wire 710 in the front-rear direction. The front waterproofing portion 350 is positioned forward of the rear waterproofing portion 300 in the front-rear direction. A connection portion between the contact main 420 and the electrical wire 710 is positioned between the front waterproofing portion 350 and the rear waterproofing portion 300 in the front-rear direction. A part of the electrical wire 710 is positioned between the front waterproofing portion 350 and the rear waterproofing portion 300 in the front-rear direction. The sleeve member 600 is positioned between the front waterproofing portion 350 and the rear waterproofing portion 300 in the front-rear direction. The front waterproofing portions 350 correspond the contacts 400 and the contact accommodating portions 210, respectively. Each of the front waterproofing portions 350 seals a space between the corresponding contact 400 and the inner wall 212 of the corresponding contact accommodating portion 210. More specifically, each of the front waterproofing portions 350 seals a space between the corresponding contact 400 and the first inner wall 2132 of the first accommodating portion 213 and the corresponding contact accommodating portion 210. The contact main 420 of each of the contacts 400 is connected with the electrical wire 710 between the corresponding front waterproofing portion 350 and the corresponding rear waterproofing portion 300.

As described above, each of the rear waterproofing portions 300 seals the space between the corresponding electrical wire 710 and the inner wall 212 of the corresponding contact accommodating portion 210, while each of the front waterproofing portions 350 seals the space between the corresponding contact 400 and the inner wall 212 of the corresponding contact accommodating portion 210. In addition, the contact main 420 of each of the contacts 400 is connected with the electrical wire 710 between the corresponding front waterproofing portion 350 and the corresponding rear waterproofing portion 300 as described above. This prevents water droplets from entering from the outsides of the front waterproofing portion 350 and the rear waterproofing portion 300 into a space where the connection portion of the contact main 420 and the electrical wire 710 exists. In other words, the connection portion of the contact main 420 and the electrical wire 710 is waterproofed.

Figure 7:
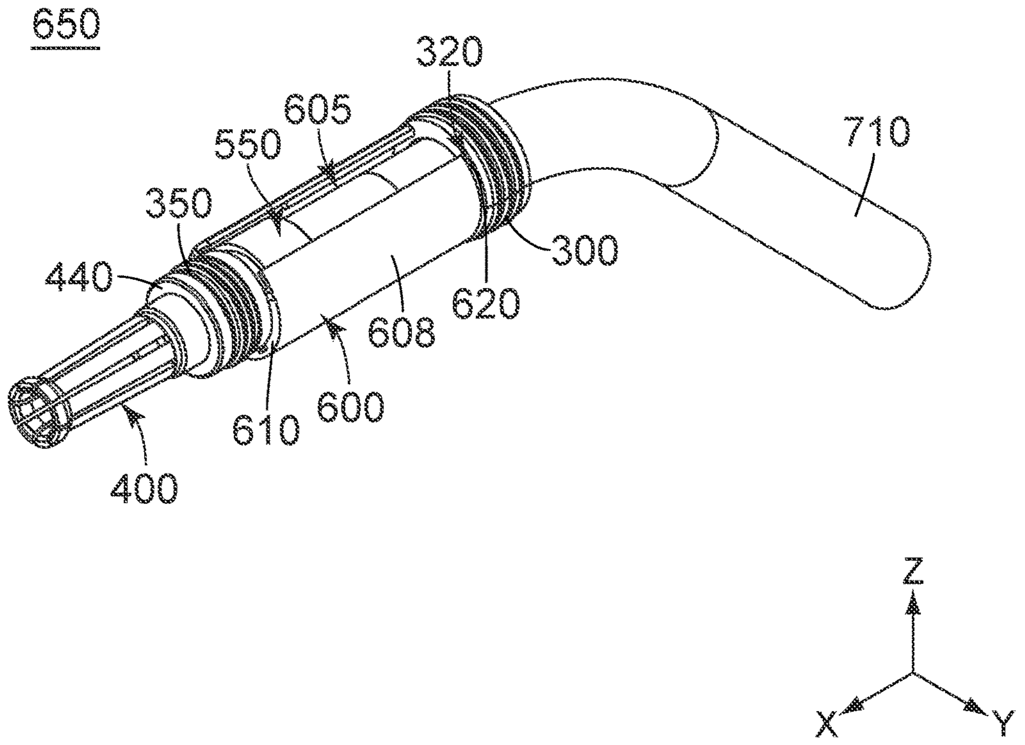
FIG. 7 is a perspective view showing a connector element which is included in the internal structure of FIG. 6.
Figure 8:
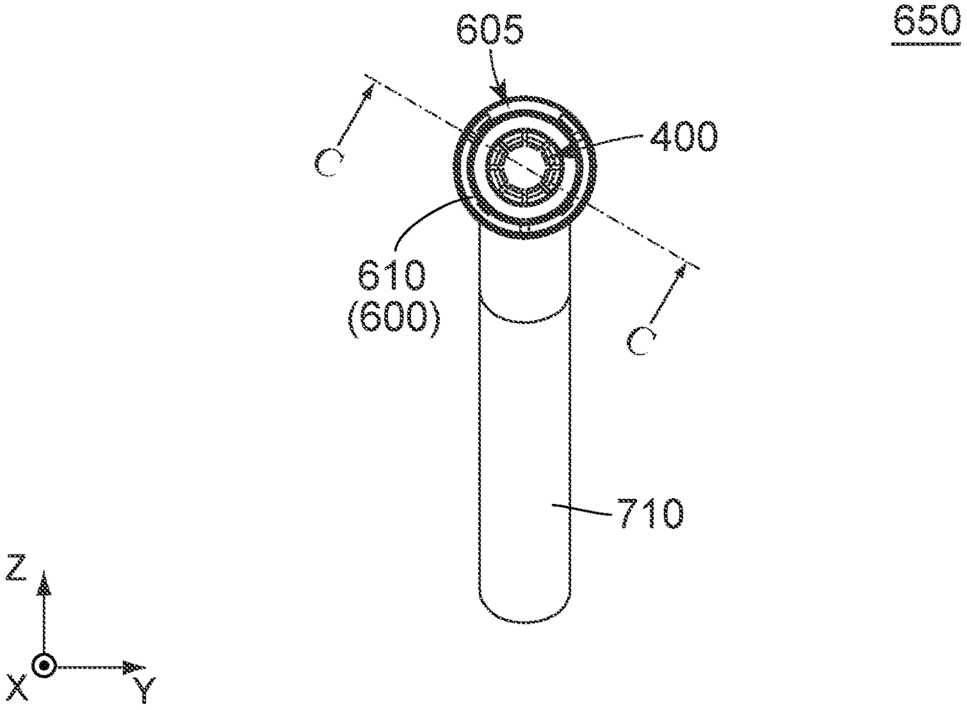
FIG. 8 is a front view showing the connector element of FIG. 7.

Referring to FIG. 7, a set of the contact 400, the front waterproofing portion 350, the rear waterproofing portion 300 and the electrical wire 710 forms a connecting element 550. In other words, the connector 100 has two of the connecting elements 550.

Referring to FIG. 7, a set of the connecting element 550 and the sleeve member 600 forms a connector element 650. In other words, the connector 100 has two of the connector elements 650.

The configuration of the connector 100 is not limited thereto, but, for example, the connector 100 can be modified as described below.

Figure 16:
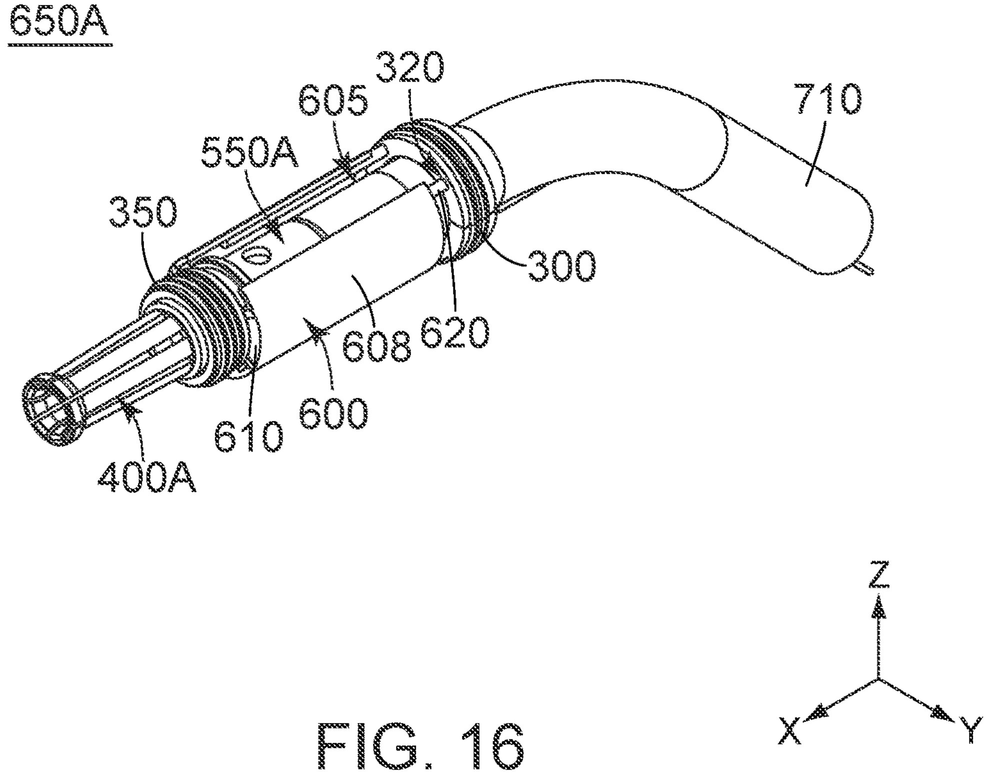
FIG. 16 is a perspective view showing a modification of the connector element of FIG. 7.
Figure 17:
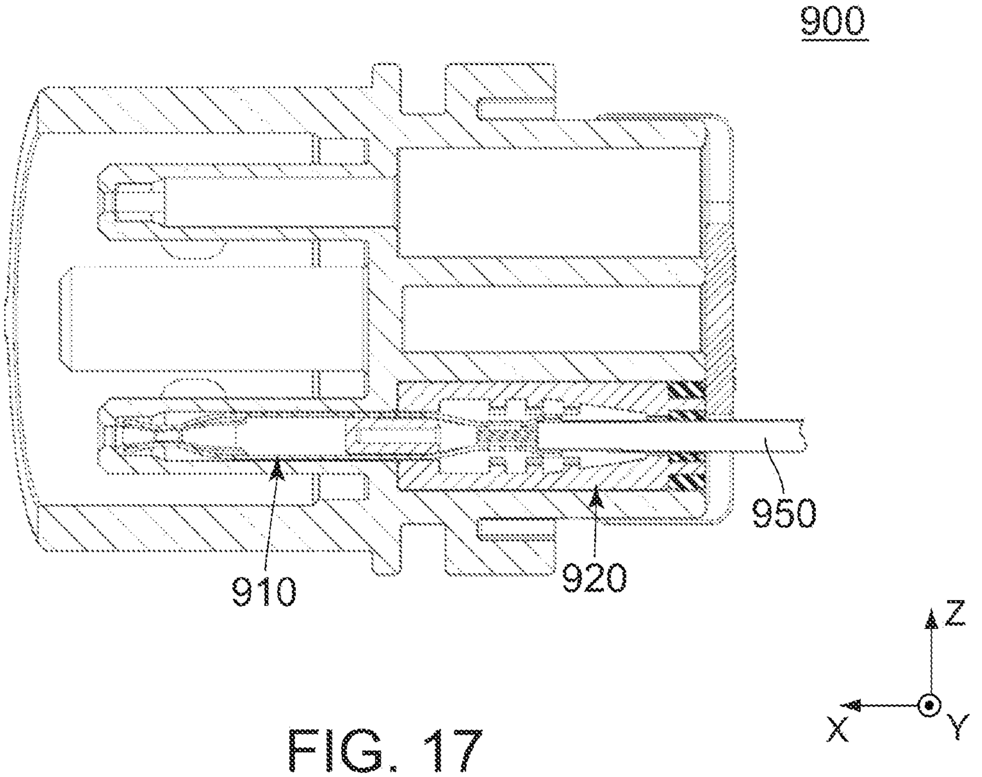
FIG. 17 PRIOR ART
FIG. 17 is a cross-sectional view showing a connector of Patent Document 1.
Figure 18:
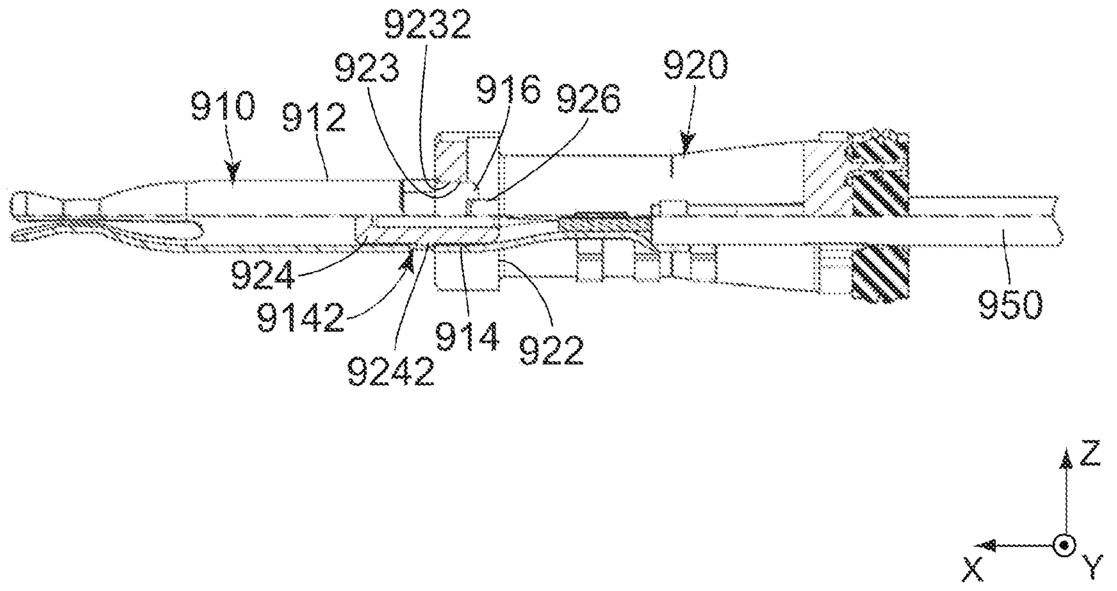
FIG. 18 PRIOR ART
FIG. 18 is a cross-sectional view showing a contact, an electrical wire and a sleeve member which are included in the connector of FIG. 17.
Figure 19:
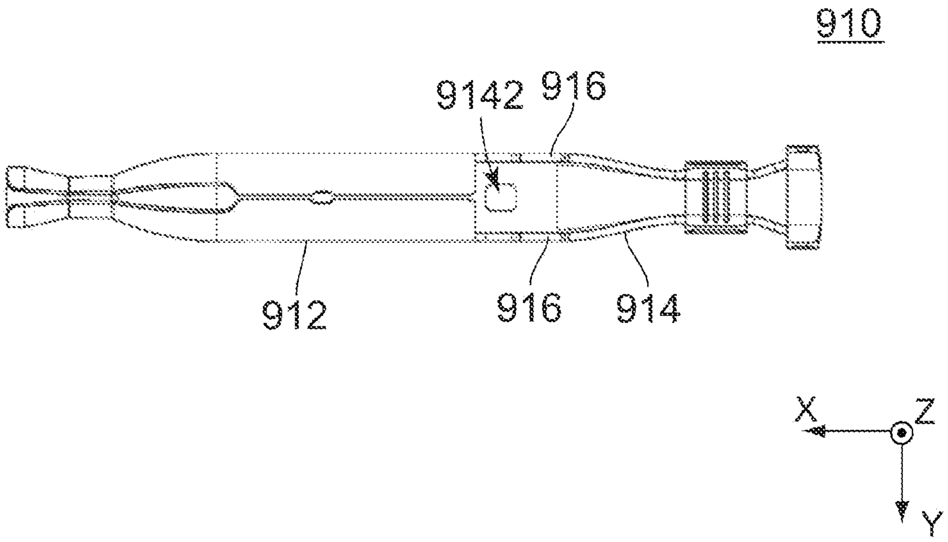
FIG. 19 PRIOR ART
FIG. 19 is a top view showing the contact which is included in the connector of FIG. 17.

Referring to FIG. 16, a connector (not shown) of a modification comprises a housing (not shown), two holders (not shown) and two connector elements 650A. Components other than the connector elements 650A have structures same as those of the aforementioned embodiment, and a detailed explanation thereabout is omitted.

As shown in FIG. 16, the connector element 650A of the present modification has a contact 400A, a front waterproofing portion 350, a rear waterproofing portion 300, a sleeve member 600 and an electrical wire 710. Components other than the contact 400A have structures same as those of the aforementioned embodiment, and a detailed explanation thereabout is omitted.

As shown in FIG. 16, the contact 400A of the present modification is provided with a contact portion 410 and a contact main 420. In other words, the contact 400A of the present modification is provided with no wall portion 440 dissimilar to the contact 400 of the aforementioned embodiment. Accordingly, the overall length of the contact 400A of the present modification can be reduced as compared to that of the contact 400 of the aforementioned embodiment. As understood from FIGS. 5, 7 and 16, the connector of the present modification is configured so that the front waterproofing portion 350 of the connector element 650A directly faces the housing in the front-rear direction. Specifically, the connector of the present modification is configured so that the front waterproofing portion 350 of the connector element 650A directly faces a facing portion 2133 in the front-rear direction.

Although the specific explanation about the present invention is made above referring to the embodiments, the present invention is not limited thereto and is susceptible to various modifications and alternative forms.

The connector 100 of the aforementioned embodiment is configured as follows: the first press-fit portion 430 is the recess; the second press-fit portion 630 is the protrusion; and the second press-fit portion 630 is press-fit into the first press-fit portion 430 in the direction perpendicular to the front-rear direction and thereby the relative movement of the sleeve member 600 with respect to the contact 400 along the front-rear direction is regulated. However, the present invention is not limited thereto. Specifically, the connector 100 may be configured as follows: the first press-fit portion 430 is a protrusion; the second press-fit portion 630 is a recess; and the first press-fit portion 430 is press-fit into the second press-fit portion 630 in the direction perpendicular to the front-rear direction and thereby the relative movement of the sleeve member 600 with respect to the contact 400 along the front-rear direction is regulated. In other words, the connector 100 should be configured as follows: one of the first press-fit portion 430 and the second press-fit portion 630 is press-fit into a remaining one of the first press-fit portion 430 and the second press-fit portion 630 in the direction perpendicular to the front-rear direction and thereby the relative movement of the sleeve member 600 with respect to the contact 400 along the front-rear direction is regulated.

Although the connector 100 of the aforementioned embodiment is configured so that the contact 400 is provided with the first press-fit portion 430 while the sleeve member 600 is provided with the second press-fit portion 630, the present invention is not limited thereto. Specifically, the connector 100 may be modified as follows: the contact 400 is further provided with an additional first press-fit portion, which is a protrusion, in addition to the first press-fit portion 430 which is the recess; the sleeve member 600 is further provided with an additional second press-fit portion, which is a recess, in addition to the second press-fit portion 630 which is the protrusion; and the additional first press-fit portion is press-fit into the additional second press-fit portion in the direction perpendicular to the front-rear direction. Alternatively, the connector 100 may be modified as follows: the first press-fit portion 430 is a protrusion; the second press-fit portion 630 is a recess; the contact 400 is further provided with an additional first press-fit portion which is a recess; the sleeve member 600 is further provided with an additional second press-fit portion which is a protrusion; the first press-fit portion 430 is press-fit into the second press-fit portion 630 in the direction perpendicular to the front-rear direction; and the additional second press-fit portion is press-fit into the additional first press-fit portion in the direction perpendicular to the front-rear direction.

Although the sleeve member 600 of the aforementioned embodiment consists of the single member, the present invention is not limited thereto. Specifically, the sleeve member 600 may be formed by combining two members, namely, an upper member and a lower member which are separated from each other.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising a housing, a holder, a contact, an electrical wire, and a sleeve member, wherein:

the housing includes a contact accommodating portion;

the contact accommodating portion has a rear end in a front-rear direction;

the contact accommodating portion includes a first receiving portion;

the first receiving portion faces rearward in the front-rear direction;

the holder is attached to the housing;

the holder defines the rear end of the contact accommodating portion;

the holder includes a through hole and a second receiving portion;

the through hole extends through the holder in the front-rear direction;

the second receiving portion faces forward in the front-rear direction;

the contact is, at least in part, accommodated in the contact accommodating portion;

the contact includes a first press-fit portion;

the electrical wire is connected to the contact;

the electrical wire extends from the contact accommodating portion to an outside of the contact accommodating portion through the through hole;

the sleeve member is attached to the contact so as to accommodate a part of the contact and a part of the electrical wire;

the sleeve member includes a first abutment portion, a second abutment portion, and a second press-fit portion;

the first abutment portion abuts against the first receiving portion;

the second abutment portion abuts against the second receiving portion; and one of the first press-fit portion and the second press-fit portion is press-fit into a remaining one of the first press-fit portion and the second press-fit portion in a direction perpendicular to the front-rear direction and thereby a relative movement of the sleeve member with respect to the contact along the front-rear direction is regulated.

2. The connector as recited in claim 1, wherein:

the first press-fit portion comprises a recess;

the second press-fit portion comprises a protruding portion; and the second press-fit portion is press-fit into the first press-fit portion.

3. The connector as recited in claim 2, wherein:

the second press-fit portion has at least three thicker portions; and each of the thicker portions is press-fit into the first press-fit portion.

4. The connector as recited in claim 1, wherein the sleeve member has a cross-section which has an annular shape with a cut or has a polygonal annular shape with a cut.

5. The connector as recited in claim 4, wherein the sleeve member has a C-like cross-section in a plane perpendicular to the front-rear direction.

6. The connector as recited in claim 4, wherein:

the first press-fit portion comprises a recess;

the second press-fit portion comprises a protruding portion; and the second press-fit portion consists of at least two protrusions which are spaced apart from each other in a circumferential direction about an axis parallel to the front-rear direction.

7. The connector as recited in claim 1, wherein:

the connector further comprises a front waterproofing portion;

the front waterproofing portion is attached to an outer periphery of the contact; and the front waterproofing portion directly faces the housing in the front-rear direction.

* * * * *